G. O. SMALLEY.
SELF LUBRICATING BEARING.
APPLICATION FILED JUNE 8, 1918.
1,299,799.
Patented Apr. 8, 1919.
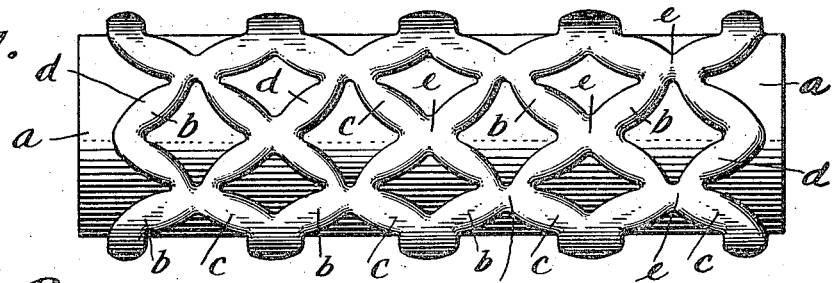
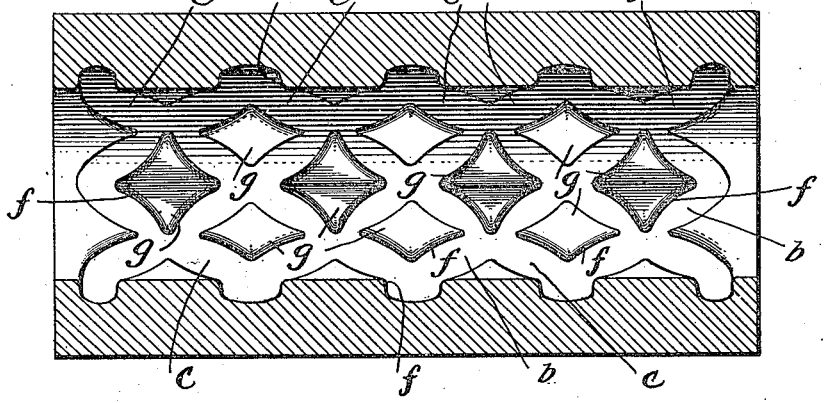
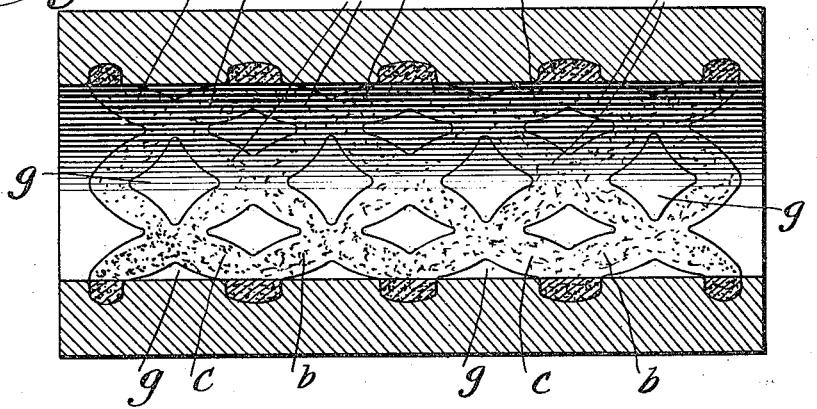
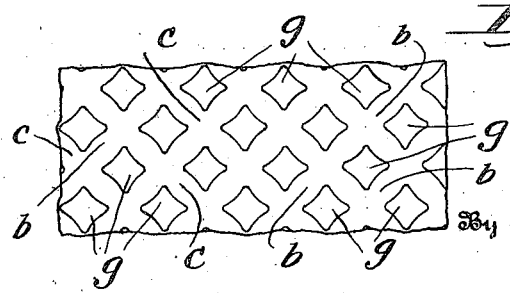
Inventor
George O. Smalley
By his Attorney

UNITED STATES PATENT OFFICE.

GEORGE O. SMALLEY, OF BOUNDBROOK, NEW JERSEY, ASSIGNOR TO BOUND BROOK OIL-LESS BEARING COMPANY, OF BOUNDBROOK, NEW JERSEY, A CORPORATION OF NEW JERSEY.

SELF-LUBRICATING BEARING.

1,299,799. Specification of Letters Patent. Patented Apr. 8, 1919.

Application filed June 8, 1918. Serial No. 238,873.

*To all whom it may concern:*

Be it known that I, GEORGE O. SMALLEY, a citizen of the United States, and a resident of Boundbrook, in the county of Somerset and State of New Jersey, have invented certain new and useful Improvements in Self-Lubricating Bearings, of which the following is a full, clear, and exact description, whereby anyone skilled in the art may make and use the same.

The invention relates to the type of bearing which does not require the application of lubricant, but is so constructed that a lubricating element forms a part of the structure and thus the bearing is self-lubricating.

The invention is directed more particularly to the arrangement of the lubricant with reference to the disposition of the metal portions of the bearing box or shell, as hereinafter more fully explained.

The structure is designed to provide an adequate metal surface and a maximum of lubrication without endangering the life or stability of the metal shell.

The main object of the invention is to provide a bearing of the character referred to in which a series of grooves, or holding recesses, for the lubricating element, are so disposed within the metal casing that studs of metal completely surrounded by the lubricant will be provided to sustain the weight of the shaft; and furthermore to provide, in conjunction with the studs, interlocking means for preventing creeping or crawling of the lubricant in the grooves.

The invention hereinafter defined and set forth in the claims is an improvement upon my Patent No. 1,153,647, issued September 14, 1915.

Referring to the drawings:

Figure 1 illustrates a core such as is employed in casting the metal shell of the bearing.

Fig. 2 is a sectional view through the cast bearing shell, illustrating the groove elements without the lubricating material.

Fig. 3 is a view similar to that of Fig. 2, with a lubricant in the grooves.

Fig. 4 is a diagrammatic view showing a development of the interior grooves of the bearing shell or box.

Bearings consisting of metal shells with inserted graphite arranged in grooves to form a lubricating media is not new in the art. Nor is it new to provide a series of continuous lubricating grooves arranged in spiral thread form from end to end of the bearing with similarly formed spiral threads extending in the opposite direction. Such a device is illustrated in my patent hereinbefore referred to. While stud bearings have been successfully employed, it has been found that there was difficulty in giving adequate support to the shaft, without liability of distorting the plugs of metal surrounded with the graphite; and furthermore that the graphite or other lubricating compound, when subjected to undue strains due to the breaking down of the metal, would pull away along the grooves, there being no sufficient anchorage to prevent creeping of the lubricating material along the spiral grooves.

It is one of the principal objects of the present invention to overcome this difficulty and, while maintaining the very advantageous arrangement of parallel spiral grooves of coarse pitch extending from end to end of the bearing in opposite directions, to provide a means for strengthening the intermediate studs of metal and prevent the creeping of the graphite or other lubricating material surrounding the studs.

Each stud or series of studs is isolated from the adjacent stud or series of studs by the lubricating material which completely surrounds it; and these studs of metal, for sustaining the weight, are distributed in a definite manner, being arranged between the two series of intersecting spiral grooves.

The core shown in Fig. 1 illustrates the arrangement of the grooves which will be formed in the cast shell. This figure, in conjunction with Figs. 2 and 4, clearly shows the locking surfaces and extended metal portions of the sustaining studs.

It will be noted that the arrangement is such that a very slight turning movement will always carry the lubricating material across every elemental line of the metal portions of the bearing, thus giving complete and perfect lubrication for oscillatory movements of the shell or shaft as well as thorough lubrication upon complete revolutions thereof.

The core, as illustrated, has a central cylindrical portion $a$, upon which are formed series of spiral threads $b$, $c$,—one set of threads as $c$, extending from right to left upon the cylindrical portion $a$, and the second set $b$, extending from left to right. At the immediate point of intersection $d$, of the opposed threads, they are of slightly less depth than at the intermediate portions $e$, where the thread is substantially wider than at the intersecting points $d$.

This gives concaved faces $f$, to the intermediate studs $g$, which serve as locks to prevent creeping of the graphite along the grooves $c$, $d$. It also permits extending the advance points of the studs, which are of substantially diamond shape, slightly at their bases so that there is a greater support for the metal portions. This obviates liability of crumbling of the bearing surface at the tops of the studs.

It will be noted from the above that, while the arrangement of the bearing studs is in parallel spiral rows due to the formation of the threads which intersect each other, the arrangement and alinement of the studs longitudinally of the bearing is such as to provide a series of studs in parallel lines alternating with the inserted graphite, and with each parallel line of studs projecting slightly within the line of each succeeding row or line of studs. It follows that the weight of the shaft is taken up and distributed upon a number of the rows of studs, thus giving equal wearing surface and ample support for the load.

With this arrangement, a very slight rotary or oscillatory movement of the bearing or its shaft is sufficient to cause the inserted graphite to be carried in a film over the bearing studs $g$, so that the whole face of metal which comes in contact with the shaft is thoroughly and completely lubricated.

It will be observed that this lubricating value on slight oscillation is enhanced by the convex formation of the studs at the sides of the grooves, and this convex formation prevents creeping or crawling of graphite along the grooves.

In forming bearings, the cores as illustrated are first produced in a proper type of core box which has grooves corresponding to the raised threads $b$, $c$. With this core, the metal is cast in a suitable mold producing the bearing box of Figs. 2 and 3, with the grooves corresponding to the raised threads of the core.

The tubular bearing box is then packed with a compound of graphite which is forced into the grooves under high pressure and the excess material removed, leaving the grooves filled to the same height as the bearing studs.

The bearing is then subjected to vulcanization and the interior and exterior finished to size.

It is apparent that the thread may be of any desired type to best suit the needs and exigencies of any particular requirement; for instance, it may be of single, double, treble, or quadruple type.

In any event, the threading should run in opposite directions with a series of right-hand threads and an intersecting series of left-hand threads. This arrangement provides the intermediate metallic stud portions which are completely surrounded by the lubricating film of graphite.

It is, of course, apparent that the same advantageous features may be secured either in a split bearing or a tubular bearing.

What I claim as my invention and desire to secure by Letters Patent is:

1. A bearing having a shell provided with continuous lubricating grooves arranged in parallel spirals, intersected by similarly formed spirals extending in opposite direction, bearing studs intermediate the intersecting grooves, said grooves being substantially wider between their points of intersection to provide holding faces on opposite sides of the intermediate bearing studs, and a lubricating material pressed into and filling said grooves.

2. A bearing having a shell provided with continuous lubricating grooves arranged in parallel spirals, intersected by similarly formed spirals extending in opposite direction, said grooves being somewhat restricted at their points of intersection, and a lubricating material pressed into and filling said grooves.

3. A bearing having a shell provided with continuous lubricating grooves arranged in parallel spirals, intersected by similarly formed spirals extending in opposite direction, metallic studs intermediate the intersecting grooves, said grooves varying as to depth and width at their points of intersection and between their intersecting points, whereby the intermediate metallic studs are provided with concaved faces and extended points at each end of the concaved faces, and a lubricating material pressed into and filling said grooves.

4. A bearing having a shell provided with grooves intersecting each other in definite sequence, metallic studs intermediate the intersecting grooves, said studs having concaved faces extending into the grooves, thereby providing holding faces for a lubricant, and a lubricating material pressed into and filling said grooves.

5. A bearing having a shell provided with continuous lubricating grooves arranged in parallel spirals, intersected by similarly-formed spirals extending in opposite direction, said spiral grooves having alternate wide and narrow portions, and a lubricating material pressed into and filling said grooves.

6. A bearing having a shell provided with grooves intersecting each other in definite sequence, said grooves having alternately arranged wide and restricted portions providing a holding means for a lubricant, and a lubricating material pressed into and filling said grooves.

GEORGE O. SMALLEY.

Witnesses:
 ELOISE LOWANDE,
 DORA APGAR.